US010790740B2

(12) United States Patent
Singh et al.

(10) Patent No.: US 10,790,740 B2
(45) Date of Patent: Sep. 29, 2020

(54) TECHNIQUES FOR SWITCH CAPACITOR REGULATOR POWER SAVINGS

(71) Applicant: Analog Devices Global Unlimited Company, Hamilton (BM)

(72) Inventors: Amit Kumar Singh, Bangalore (IN); Sriram Ganesan, Bangalore (IN); Miguel A. Ruiz, Riba-Roja de Turia (ES); Jose Tejada, Valencia (ES)

(73) Assignee: Analog Devices Global Unlimited Company, Hamilton (BM)

( * ) Notice: Subject to any disclaimer, the term of this patent is extended or adjusted under 35 U.S.C. 154(b) by 0 days.

(21) Appl. No.: 15/968,981

(22) Filed: May 2, 2018

(65) Prior Publication Data

US 2019/0341844 A1 Nov. 7, 2019

(51) Int. Cl.
*H02M 3/07* (2006.01)
*H02M 1/00* (2006.01)

(52) U.S. Cl.
CPC ........ *H02M 3/07* (2013.01); *H02M 2003/072* (2013.01)

(58) Field of Classification Search
CPC .. H02M 2001/009; H02M 3/07; H02M 3/073; H02M 2003/072
See application file for complete search history.

(56) References Cited

U.S. PATENT DOCUMENTS 6,198,645 B1 * 3/2001 Kotowski ............... H02M 3/07 307/110
7,239,194 B2 7/2007 Azrai et al.
8,085,095 B2 12/2011 Young
(Continued)

FOREIGN PATENT DOCUMENTS

DE 102014223172 A1 5/2015
EP 2362532 A1 8/2011
(Continued)

OTHER PUBLICATIONS

"U.S. Appl. No. 14/469,974, Response filed Jun. 23, 2016 to Non Final Office Action dated Mar. 23, 2016", 29 pgs.
(Continued)

*Primary Examiner* — Thienvu V Tran
*Assistant Examiner* — Sisay G Tiku
(74) *Attorney, Agent, or Firm* — Schwegman Lundberg & Woessner, P.A.

(57) ABSTRACT

Techniques for improving efficiency of a switched-capacitor voltage regulator are provided. In an example, a switched-capacitor voltage regulator can include a switched-capacitor network having multiple gain configurations, a clock configured to switch capacitors of the switched-capacitor network between a charge state and a discharge state to provide a scaled output voltage, and a controller configured to select a capacitor configuration associated with a gain of the multiple gain configurations to provide the scaled output voltage within a desired output voltage range while continuously switching the capacitor configuration, and to interrupt switching of the capacitor configuration to permit an output voltage of the switched-capacitor voltage regulator to fall below the scaled output voltage but to remain above a lower limit of the desired output voltage range to save power by reducing losses due to the switching.

25 Claims, 6 Drawing Sheets

(56) References Cited

U.S. PATENT DOCUMENTS

| | | | |
|---|---|---|---|
| 8,089,787 B2* | 1/2012 | Melse | H02M 3/07 363/62 |
| 8,541,999 B2 | 9/2013 | Athas et al. | |
| 8,817,501 B1 | 8/2014 | Low et al. | |
| 8,928,295 B2 | 1/2015 | Chang et al. | |
| 9,054,575 B2 | 6/2015 | Ripley et al. | |
| 9,295,851 B2 | 3/2016 | Gordon et al. | |
| 9,302,591 B2 | 4/2016 | Huang | |
| 9,490,725 B2* | 11/2016 | Xia | H02M 7/25 |
| 9,660,523 B2 | 5/2017 | Stauth et al. | |
| 9,800,150 B2 | 10/2017 | Marsili et al. | |
| 9,812,954 B1 | 11/2017 | Kose et al. | |
| 2005/0030771 A1 | 2/2005 | Conte et al. | |
| 2008/0239772 A1 | 10/2008 | Oraw et al. | |
| 2009/0072800 A1* | 3/2009 | Ramadass | H02M 3/07 323/271 |
| 2009/0224834 A1 | 9/2009 | Young et al. | |
| 2009/0230934 A1* | 9/2009 | Hooijschuur | H02M 3/07 323/282 |
| 2010/0253154 A1 | 10/2010 | Yeates et al. | |
| 2011/0211717 A1* | 9/2011 | Hoevesteen | H04R 25/505 381/323 |
| 2012/0024064 A1* | 2/2012 | Wu | G01D 5/24 73/514.32 |
| 2012/0147979 A1 | 6/2012 | Best et al. | |
| 2013/0058141 A1 | 3/2013 | Oraw et al. | |
| 2013/0106380 A1* | 5/2013 | Marsili | H02M 3/07 323/283 |
| 2015/0263612 A1* | 9/2015 | Wu | H02M 3/07 323/312 |
| 2016/0028302 A1* | 1/2016 | Low | H02M 3/073 363/50 |
| 2016/0062378 A1 | 3/2016 | Ruiz et al. | |
| 2016/0352219 A1* | 12/2016 | Amgad Abdulslam | H02M 3/07 |
| 2017/0279349 A1* | 9/2017 | Nork | H02M 3/07 |
| 2017/0288532 A1* | 10/2017 | Zhou | H02M 1/08 |
| 2017/0288534 A1 | 10/2017 | Lesso et al. | |
| 2018/0316262 A1* | 11/2018 | Villar Pique | H02M 3/07 |

FOREIGN PATENT DOCUMENTS

| | | |
|---|---|---|
| EP | 2385615 | 11/2011 |
| JP | 2004048255 A | 2/2004 |

OTHER PUBLICATIONS

"U.S. Appl. No. 14/469,975, Advisory Action dated Jan. 13, 2017", 4 pgs.
"U.S. Appl. No. 14/469,975, Ex Parte Quayle Action mailed Jun. 30, 2017", 11 pgs.
"U.S. Appl. No. 14/469,975, Examiner Interview Summary dated Jul. 8, 2016", 3 pgs.
"U.S. Appl. No. 14/469,975, Final Office Action dated Oct. 20, 2016", 32 pgs.
"U.S. Appl. No. 14/469,975, Non Final Office Action dated Mar. 23, 2016", 26 pgs.
"U.S. Appl. No. 14/469,975, Notice of Allowance dated Feb. 15, 2017", 12 pgs.
"U.S. Appl. No. 14/469,975, Notice of Allowance dated Sep. 12, 2017", 12 pgs.
"U.S. Appl. No. 14/469,975, Response filed Jan. 20, 2017 to Final Office Action dated Oct. 20, 2016", 19 pgs.
"U.S. Appl. No. 14/469,975, Response filed Dec. 20, 2016 to Final Office Action dated Oct. 20, 2016", 18 pgs.
"U.S. Appl. No. 14/469,975, Response to Ex Parte Quayle Action filed Aug. 23, 2017", 11 pgs.
"U.S. Appl. No. 14/469,975, Supplemental Response filed May 25, 2017", 9 pgs.
"Chapter 9: Power Management", 98 pgs.
"Ultra Low Power ARM Cortex-M4F MCU with Integrated Power Management", Analog Devices—ADuCM4050, (2017), 39 pgs.
Baba, David, "Benefits of a multiphase buck converter", (2012), 8-15.
Dildine, Bob, "Buck Converter Basics", Bob Dildine, W6SFH—2321 Sycamore Ave, Santa Rosa, CA 95404 w6sfh@sonic.net, (Jan. 1, 2013), 7-10.
Gouni, Sudhir Reddy, "Fully Integrated Switched Capacitor Buck Converter With High Efficiency and Low Output Ripple", A thesis submitted to the Graduate School in partial fulllment of the requirements for the degree Master of Sciences, Engineering Specialization in: Electrical Engineering—New Mexico State University—Las Cruces, New Mexico—Nov. 2012, (Nov. 1, 2012), 91 pgs.
Huang, Wenkang, et al., "A Scalable Multiphase Buck Converter with Average Current Share Bus", International Rectifier, Rhode Island IC Design Center 200 Circuit Drive, North Kingstown, RI 02852, U.S.A., (2003), 1-7.
Kester, Walter, et al., "Switched capacitor voltage converters", Practical Design Techniques for Power and Thermal Management, Edited by Walt Kester, Analog Devices, 1998, ISBN-0-916550-19-2, (1998), 21.
Le, Hanh-Phuc, et al., "Design Techniques for Fully Integrated Switched-Capacitor DC-DC Converters", IEEE Journal of Solid-State Circuits, vol. 46, No. 9, (Sep. 2011), 2120-2131.
Ma, Mengzhe, "Design of High Efficiency Step-Down Switched Capacitor DC/DC Converter", An Abstract of the Thesis of Mengzhe Ma for the degree of Master of Science in Electrical and Computer Engineering presented on May 21, 2003., (May 21, 2003), 71 pgs.
Makowski, Marek S., "Performance Limits of Switched-Capacitor DC-DC Converters", (1995), 1215-1221.
Marasco, Ken, "How to Apply DC-to-DC Step-Down (Buck) Regulators Successfully", Analog Dialogue 45-06 Back Burner, Jun. 2011—www.analog.com/analogdialogue, (Jun. 1, 2011), 4 pgs.
Meeks, Daniel, "Loop Stability Analysis of Voltage Mode Buck Regulator With Different Output Capacitor Types—Continuous and Discontinuous Modes", (2008), 1-36.
Oota, Ichirou, et al., "A General Method for Deriving Output Resistances of Serial Fixed Type Switched-Capacitor Po Wer Supplies", (2000), III-503-III-506.
Ramadass, Yogesh K., et al., "Voltage Scalable Switched Capacitor DC-DC Converter for Ultra-Low-Power On-Chip Applications", Microsystems Technology Laboratory, Massachusetts Institute of Technology, Cambridge, MA,, (Jun. 17, 2007), 2353-2359.
Raut, Snehal, "Semi-custom VLSI Design and Realization of DC-DC Converters in UMC90", M.Sc. Thesis, (2009), 75 pgs.
Seeman, Michael Douglas, "A Design Methodology for Switched-Capacitor DC-DC Converters", Electrical Engineering and Computer Sciences—University of California at Berkeley—Technical Report No. UCB/EECS-2009-78 http://www.eecs.berkeley.edu/Pubs/TechRpts/2009/EECS-2009-78.html May 21, 2009, (May 21, 2009), 249 pgs.
Seeman, Michael D., et al., "Analysis and Optimization of Switched-Capacitor DC-DC Converters", IEEE Transactions on Power Electronics, vol. 23, No. 2, (Mar. 2008), 841-851.
Seeman, Michael D., et al., "Analysis and Optimization of Switched-Capacitor DC-DC Converters", (2008), 841-851.
Tu, Qingrui, et al., "Reduced Switching-Frequency Modulation and Circulating Current Suppression for Modular Multilevel Converters", IEEE Transactions on Power Delivery, vol. 26, Issue 3, (Apr. 5, 2011), 2009-2017.
Zhu, Guangyong, et al., "Switched-Capacitor Power Supplies: DC Voltage Ratio, Efficiency, Ripple, Regulation", IEEE International Symposium on Circuits and Systems. Circuits and Systems Connecting the World. ISCAS 96, (May 15, 1996), 553-556.
"European Application Serial No. 19171194.4, Extended European Search Report dated Sep. 18, 2019", 8 pgs.
"European Application Serial No. 19171194.4, Communication Pursuant to Article 94(3) EPC dated Apr. 14, 2020", 4 pgs.
"European Application Serial No. 19171194.4, Communication pursuant to Articlee 94(3) EPC dated May 14, 2020", 4 pgs.

(56) References Cited

OTHER PUBLICATIONS

"Taiwanese Application Serial No. 108115226, Office Action dated Mar. 3, 2020", 4 pgs.

* cited by examiner

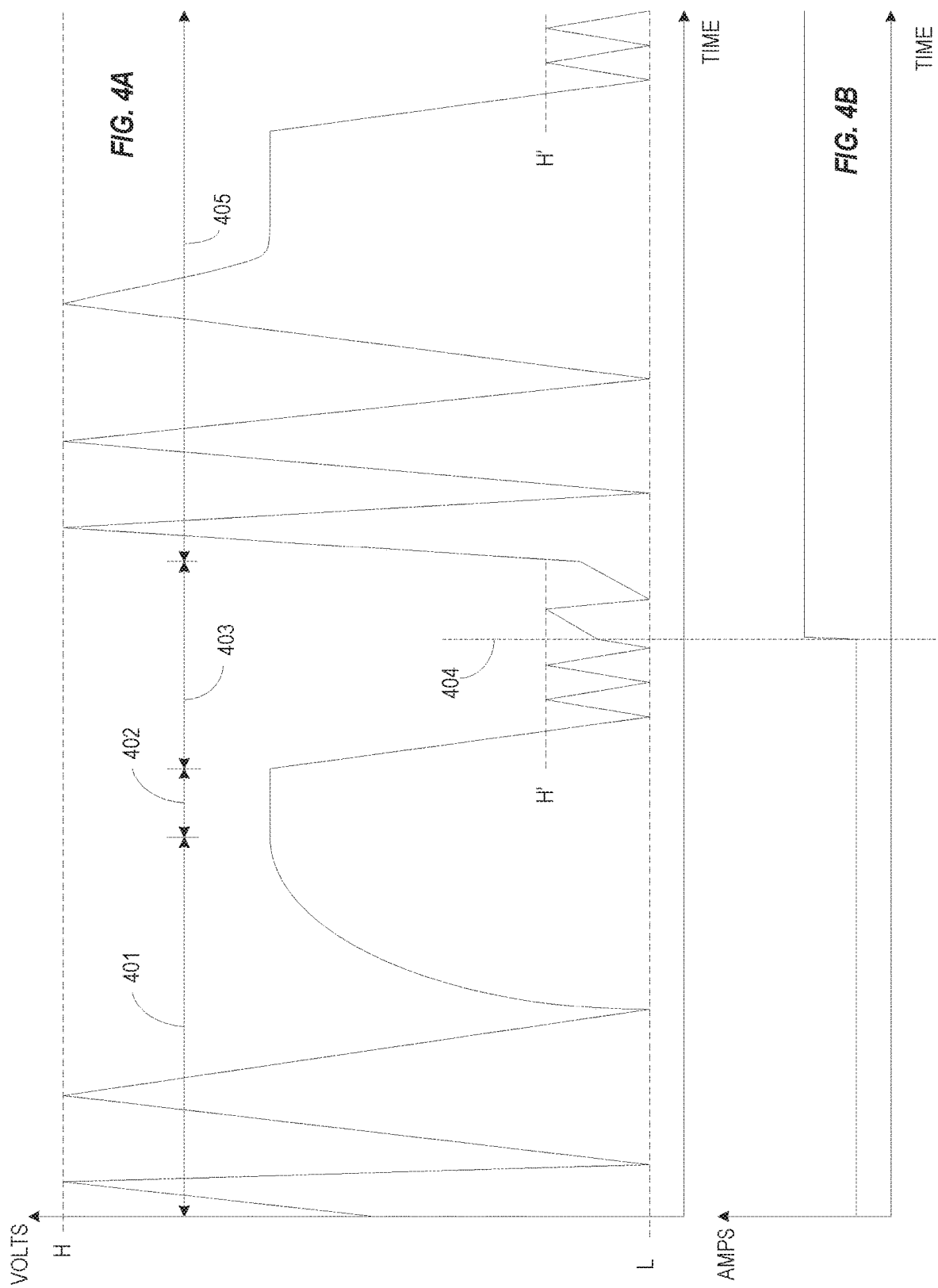

Phase I

Phase II

TECHNIQUES FOR SWITCH CAPACITOR REGULATOR POWER SAVINGS

FIELD OF THE DISCLOSURE

This document pertains generally, but not by way of limitation, to voltage regulators, and more particularly, to switched-capacitor voltage regulator power saving techniques.

BACKGROUND

Buck regulators are regularly used in applications that rely on a limited energy source such as a battery or capacitor, however, other application also make use of buck regulators. Ultra-low power (ULP) systems often include buck regulators because buck regulators are more efficient than, for example, linear regulators. Some ULP systems can be in a standby mode significantly more than in an active mode, hence having an efficient power converter that can support a few micro amperes of load in standby mode can increase the battery lifetime greatly.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 4A and 4B illustrates graphically the output voltage and output current, respectively, of an example switched-capacitor voltage regulator according to various aspects of the present subject matter.

DETAILED DESCRIPTION

Figure 1:
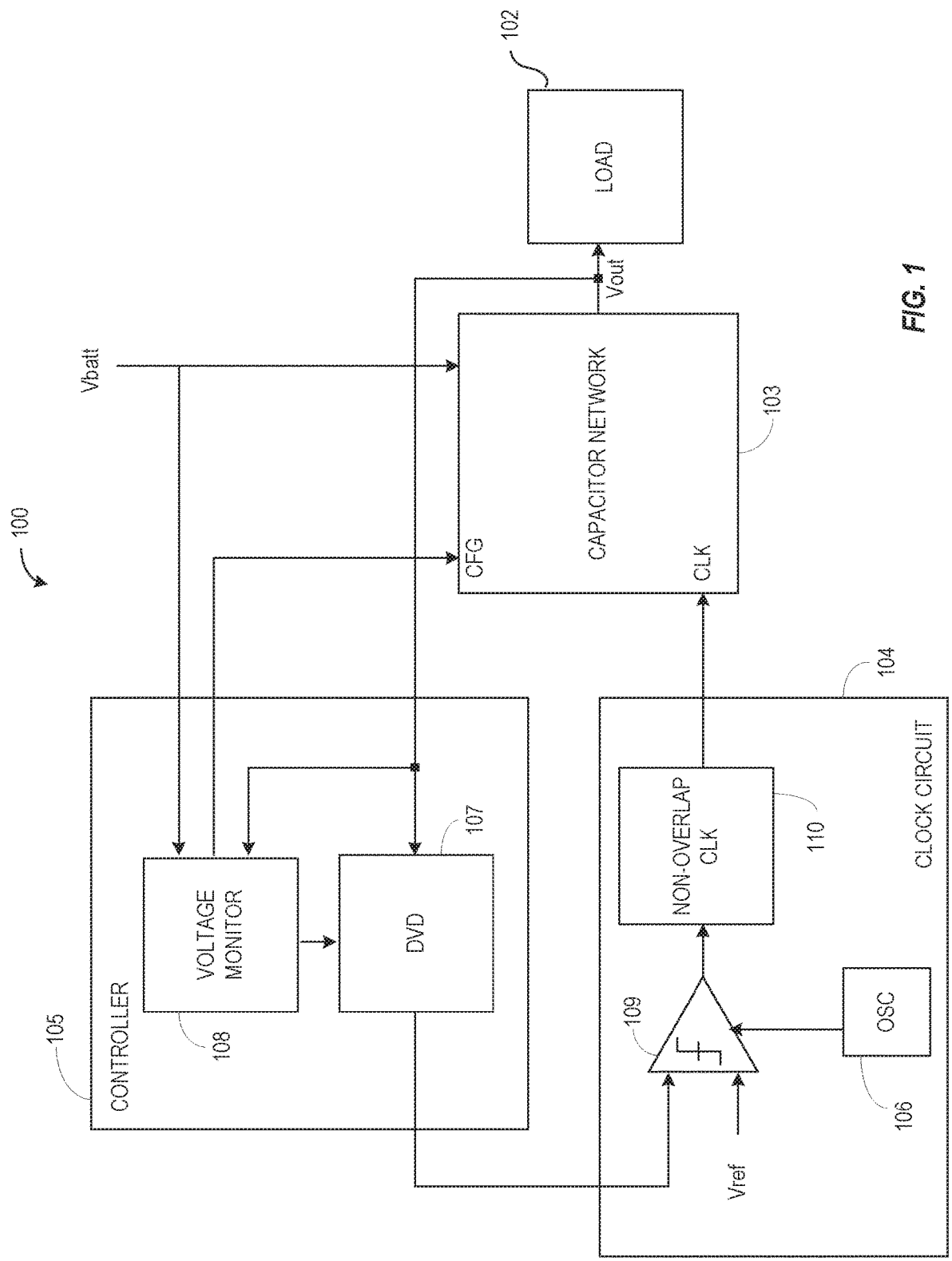
FIG. 1 illustrates generally an example circuit for improving the efficiency of a switch-capacitor regulator in supplying power to a load.

Existing ULP regulators can vary quite significantly. Switch capacitor regulators appear to be the most common architecture where a battery powered device is designed to incur significant amounts of standby operation compared to active operation. Control of switched-capacitor regulators can also vary. More common control flavors can include hysteretic control or output voltage control. A hysteretic control for a switch capacitor regulator typically is enabled when an output voltage hits a lower limit and then is disabled when the output voltage hits an upper limit. Such a control ensures the output voltage is related with the upper and lower limits. In certain designs, a regulator having hysteretic control can include a battery monitor to allow a gain adjustment as the battery voltage changes. If gain selection is limited, efficiency can vary significantly over the range of possible battery voltages. Also, hysteretic controlled regulators typically do not monitor load current resulting in significant power loss at light loads.

ULP regulators employing output voltage control can adapt the gain of the regulator based on the output voltage. Such control allows for a gain selection that indirectly considers battery voltage and load current. Such controllers typically provide more gains to select from which can help with efficiency over a wide range of output voltages or battery voltages.

The present inventors have recognized an improved control method that allows for improved efficiency of a switch capacitor buck regulator. In general, the inventors have recognized that power provided by a battery when using a switch capacitor buck regulator can be minimized using three factors:

(1) selecting a minimum gain of a plurality of linearly distributed gains for the given battery voltage and load current that can yield a constant output voltage between a desired upper and lower voltage limit. Such voltage limits can be just inside the maximum voltage and minimum voltage that allows for robust and predictable operation of the device including the regulator.

(2) keeping the output voltage of the regulator close to lower voltage limit, and (3) reducing the losses in the regulator, such as by only switching the regulator when necessary.

Hysteretic control schemes can satisfy the third factor but cannot meet the first and second factors. Output voltage based control can meet the first factor. In some versions, with enough gain selection, a switch capacitor regulator using output voltage control may be able to meet the second factor. However, switch-capacitor, output-voltage controlled regulators do not meet the third factor as such control schemes continuously switch the regulator.

On can model a battery supplied buck regulator mathematically for example by, $$V_{OUT}=A \cdot V_{BAT}, \quad \text{(Eq. 1)}$$

$$I_{BAT}=A \cdot I_{LOAD}, \quad \text{(Eq. 2)}$$

where A is the gain of the regulator and is <1, $V_{OUT}$ is the output voltage of the regulator, $V_{BAT}$ is the battery voltage supplied to the regulator, $I_{BAT}$ is the current supplied by the battery, and $I_{LOAD}$ is the current consumed by the load connected to the regulator output.

If the impedance ($Z_0$) of the regulator is included, Eq. 1 becomes.

$$V_{OUT}=A \cdot V_{BAT}-I_{LOAD} \cdot Z_0 \quad \text{(Eq. 3)}$$

The power drawn from the battery (PBAT) can be expressed as, $$P_{BAT}=V_{BAT} \cdot I_{BAT}=(V_{OUT}+I_{LOAD} \cdot Z_0) \cdot I_{LOAD} \quad \text{(Eq. 4)}$$

$$P_{BAT}=V_{OUT} \cdot I_{LOAD}+(A \cdot V_{BAT}-V_{OUT}) \cdot I_{LOAD} \quad \text{(Eq. 5)}$$

$$P_{BAT}=A \cdot V_{BAT} \cdot I_{LOAD} \quad \text{(Eq. 6)}$$

The load current ($I_{LOAD}$) can be expressed as, $$I_{LOAD}=I_{FIXED}+k \cdot (V_{OUT})^\alpha \quad \text{(Eq. 7)}$$

where $\alpha=1$ for dynamic current and a higher order for leakages. Consequently, there is a portion of the power used from the battery that depends on the output voltage of the regulator. In a more precise model, the total power drawn from the battery can also include losses in the regulator ($P_{LOSS}$), for example, due to parasitic capacitance switching, or continuous operation of non-overlapping clock generation schemes. Editing the equations above, the battery power ($P_{BAT}$) can be expressed as, $$P_{BAT} = A \cdot V_{BAT}(I_{FIXED} + k \cdot (V_{OUT})^\alpha) + P_{LOSS} \qquad \text{(Eq. 8)}$$

The inventors have recognized that the switching losses associated with the $k \cdot (V_{OUT})^\alpha$ term in Eq. 8 can form a basis for making an incremental power saving improvement in regulator. The new control scheme uses modified output voltage based control to take advantage of the substantially constant output impedance characteristic resulting from uniformly, or linearly, interspersed gain settings and the ability to adapt to a minimum gain. The modification allows the control circuit to establish a lower upper voltage limit than the gain selection upper voltage limit after the minimum gain of the regulator is selected. The modification allows the regulator to provide an output voltage that, on average, is lower than scaled voltage associated with the regulator continuously operating with the selected gain. Operating the regulator with a lower voltage and resulting lower current reduces the power draw from the battery. In certain examples, control of the range of the output voltage closer to the lower limit can be achieved without having to increase the gain resolution of an existing output voltage based controller. Additional power savings, for example, via lower switching losses, can be achieved by using hysteretic control to regulate the output voltage closer to the lower voltage limit.

Furthermore, hysteretic control can also allow supporting higher loads by increasing the clock frequency without incurring more losses at lighter loads. Employing the new "lower" upper voltage threshold or low-power threshold (H') close to the lower threshold (L) can also ensure that the regulator's on-to-off time ratio is lower, hence reducing losses even further. For example, once the clock is switched "on" after the regulator discharges to the lower threshold (L), the charging time of the equivalent RC network of the system (e.g., $Z_0 C_{load}$) increases exponentially as the output voltage rises (so keeping H' low compared to the scaled voltage helps) whereas the voltage discharge, once the regulator reaches the new lower upper threshold (H') and is switched "off", is a function of load current and load capacitance ($C_{load}$) and hence is linear with time. Therefore, by lowering the upper voltage threshold (H) to the low-power threshold (H'), the "on" time of the regulator can be reduced significantly.

FIG. 1 illustrates generally an example switched-capacitor voltage regulator 100 with better efficiency than conventional switched-capacitor regulators in supplying power to a load 102. In an example, the switched-capacitor voltage regulator 100 can include a switched-capacitor network 103 or array, a clock circuit 104, and a controller 105. In certain examples, the controller 105 can include a dynamic voltage divider 107 within a feedback circuit or network, and a voltage monitor 108. The clock circuit 104 can include an oscillator 106, a comparator 109, and a non-overlapping clock generator 110. The switched-capacitor network 103 can be coupled to a battery voltage (Vbatt) and can have multiple configurations. Each configuration can be associated with a gain such that the controller 105 can select a particular gain to supply power to the load 102 with continuous current and at a scaled output voltage within a pre-determined voltage range. The clock circuit 104 can time the switching of the capacitors of the switched-capacitor network 103 between a charge state and a discharge state to provide an output voltage (Vout), and load current. The controller 105, via the voltage monitor 108, can receive the battery voltage (Vbatt) and the output voltage (Vout) of the switched-capacitor network 103, and can select a capacitor configuration associated with a particular gain to provide the scaled output voltage within the desired or predetermined output voltage range while the clock circuit 104 continuously switches the capacitors of the switched-capacitor network 103 between the charge state and the discharge state.

In certain examples, the controller 105 can use the dynamic voltage divider 107 to disable the clock circuit 104 or otherwise interrupt the switching of the capacitor configuration of the switched-capacitor network 103 to permit the output voltage (Vout) to fall below the scaled output voltage, but to remain above a lower limit of the desired output voltage range. In certain examples, the comparator 109 can enable and disable the clocking of the switched-capacitor network 103 based on a comparison of an output of the dynamic voltage divider 107 and a reference voltage ($V_{ref}$). Interrupting the switching of the capacitors of the switched-capacitor network 103 while not allowing the output voltage (Vout) to fall below a lower threshold of the desired or predetermined output voltage range can reduce switching losses of the regulator 100 while also delivering close to the minimum power needed to allow the load to function properly.

In certain examples, the controller 105 can disable the clock circuit 104 to interrupt switching of the capacitor configuration of the switched-capacitor network 103. In such examples, the controller 105 can interrupt the clock when the output voltage meets or exceeds a low-power threshold (H'). The low-power threshold (H') can be significantly lower than either the scaled output voltage or the upper voltage limit (H) of the desired or predetermined output voltage range. If the load current remains steady, as is usually the case when a device is in a low-power mode or a sleep mode, the power consumed by the load 102 will generally be consumed at a lower voltage and a lower current draw than if the switched-capacitor network 103 remained in a constant switching mode. In certain examples, the low-power threshold (H') can be established by modifying the feedback circuit such as by dynamically re-configuring the dynamic voltage divider 107. In certain examples, the dynamic voltage divider 107 can be modified for the low-power threshold (H') such that, at the comparator 109, the feedback voltage appears to be at the upper limit (H) of the desired or predefined output voltage range when the actual output voltage (Vout) is at the low-voltage threshold (H').

After the clock circuit 104 is interrupted when the output voltage (Vout) is at the low-power threshold (H'), the controller 105 can enable the clock circuit 104 when the output voltage (Vout) level meets or falls below a lower limit (L) of the desired or predetermined output voltage range. In certain examples, if the current draw changes, such as increases, the existing gain of the regulator 100 may not allow the output voltage (Vout) to climb to the low-power threshold (H') or may take an extended amount of time to achieve the low-power threshold (H'). The controller 105 can include a timer or counter to timeout an expected interval, after the clock circuit 104 is enabled, that the output voltage (Vout) should return to the low-power threshold (H'). The timer or counter can be reset when the output voltage (Vout) reaches the low-power threshold (H'). If the timer or counter reaches a timeout value, it can be an indication of a gain mismatch issue and can initiate a gain change of the regulator 100. In such a circumstance, the controller 105 can change one or more of the gain or the configuration of the dynamic voltage divider 107 to make sure the regulator 100 provides an adequate amount of power at a voltage within the desired or predetermined output voltage range. In certain examples, a gain mismatch issue can be detected when the voltage passes a minimum low-voltage limit with a value lower than the lower limit (L) of the desired or predetermined output voltage range.

Figure 2:
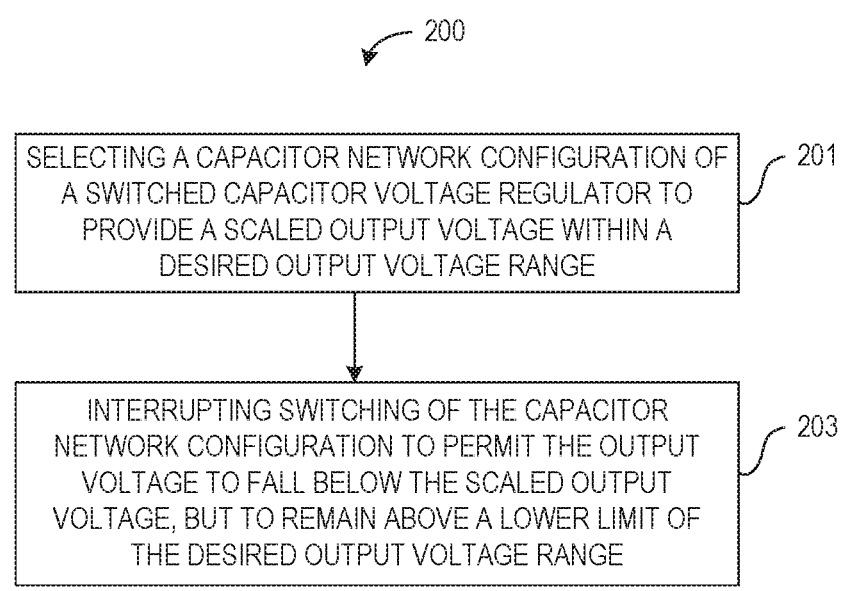
FIG. 2 illustrates generally a flowchart of an example method for operating a switched-capacitor voltage regulator to save energy.

FIG. 2 illustrates generally a flowchart of an example method 200 for operating a switched-capacitor voltage regulator. At 201, a gain or capacitor network configuration can be selected to provide a scaled output voltage to a load. The gain or configuration can be determined when the regulator, while continuously switching the given capacitor network configuration between a charge state and a discharge state can provide the scaled output voltage within a desired output voltage range. In certain examples, a controller of the switch capacitor regulator can iteratively try different gain or capacitor network configurations until the output voltage of the regulator stabilizes within the desired output voltage range. For example, a configuration that results in a gain that is too high, generally, attempts to provide scaled output voltage that exceeds a high voltage limit or threshold of the desired output voltage range. Likewise, a configuration that results in a gain that is too low, generally, is unable to maintain the output voltage above a low voltage limit or threshold of the desired output voltage range. At 203, once the gain is determined, a power-efficient high voltage limit can be established that is less than the high voltage limit of the desired output voltage range. When the scaled output voltage is above the power-efficient high voltage limit, the switching of the capacitor network of the regulator can be interrupted or disabled. When the switching of the capacitor network of the regulator is disabled, current draw of the load can discharge and stored energy of the system and the output voltage can fall toward the low voltage limit of the desired output voltage range. Upon the output voltage of the regulator falling to the low voltage limit, the switching of the capacitor network of the regulator can be enabled to raise the output voltage of the regulator.

Figure 3:
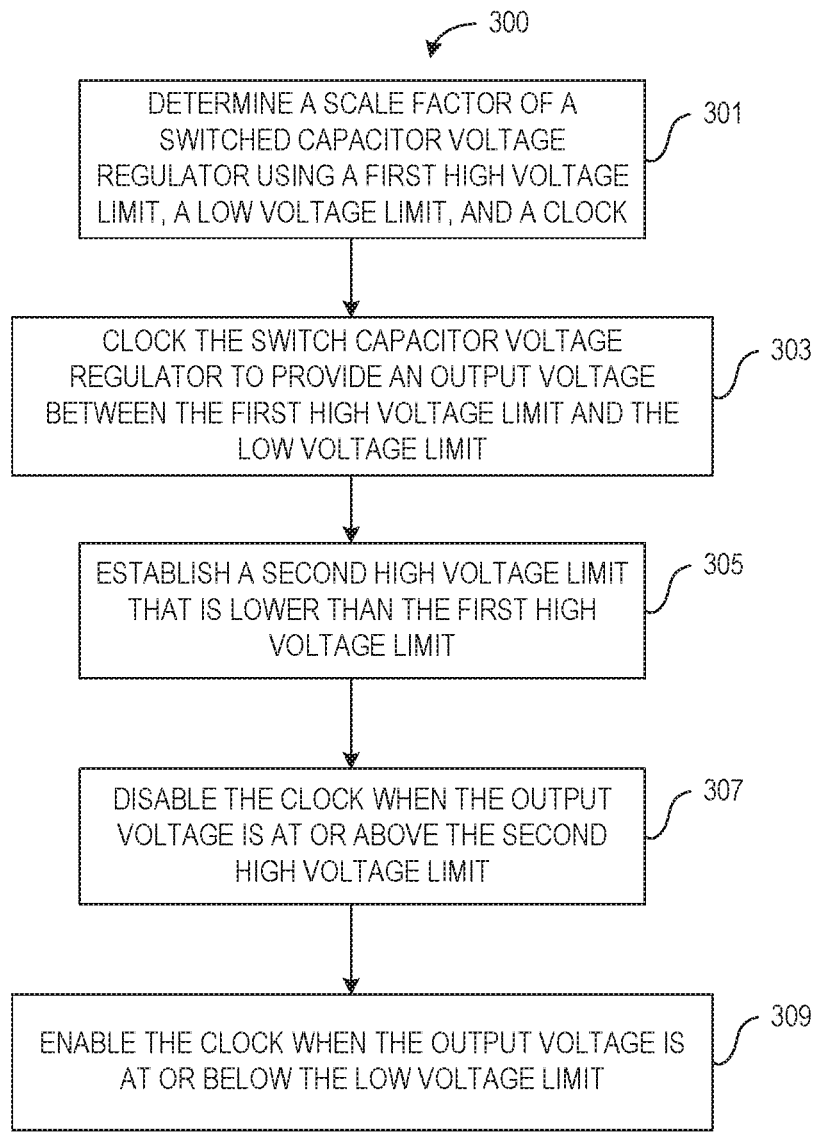
FIG. 3 illustrates generally a flowchart of an example method of operating a switched-capacitor regulator to save energy.

FIG. 3 illustrates generally a flowchart of an example method 300 of operating a switched-capacitor regulator to save energy. At 301, a scale factor or gain of a switch capacitor voltage regulator can be determined. In certain examples, the scale factor can be determined based on a first high voltage limit, a low voltage limit and a clock. The first high voltage limit and the low voltage limit can define a desired output voltage range for operating a load. At 303, the switched-capacitor voltage regulator can be clocked to provide an output voltage to a load. The output voltage can be within the desired output voltage range. At 305, a second, high voltage limit can be established. The second, high voltage limit can be lower than the first high voltage limit. At 307, when the output voltage of the regulator is at or above the second, high voltage limit, the switching of the capacitor network of the switch capacitor voltage regulator can be disabled such as by disabling a clock or clock circuit driving the capacitor network. When the switching of the capacitor network of the regulator is disabled, current draw of the load can discharge and stored energy of the system and the output voltage can fall toward the low voltage limit of the desired output voltage range. At 309, the switching of the capacitor network can be enabled when the voltage falls to the low voltage limit. Compared to the conventional, continuously switched operation of switched-capacitor voltage regulators, the establishment of the second, high voltage limit and interrupting of the switching of the capacitor network can save power via lower voltage and current operation of the load via the second, high voltage limit, and reduced switching losses because the regulator is not continuously switched.

FIGS. 4A and 4B illustrates graphically the output voltage and output current, respectively, of an example switched-capacitor voltage regulator according to various aspects of the present subject matter. At interval 401, a controller or control logic of the switched-capacitor voltage regulator can iteratively apply different capacitor network configurations, or gains, or scale factors, to provide a scaled output voltage to a load that is within a desired output voltage range defined by a first high voltage limit (H) and a low voltage limit (L). Once the gain is determined, the switch capacitor voltage regulator can supply power to the load at a scaled output voltage while continuously switching the given capacitor network configuration between a charge state and a discharge state. After a predetermined interval 402 of stable operation, a second, high voltage limit (H') can be established, doe example, via a dynamic voltage divider in a feedback path of the regulator. The second, high voltage limit can be significantly less than the first high voltage limit (H) but still above the low voltage limit (L). At 403, when the output voltage is at or above the second, high voltage limit, the switching of the capacitor network of the switched-capacitor voltage regulator can be interrupted or disabled. When the switching of the regulator is disabled, no charge is transferred from the voltage supply to the output of the regulator, so the current draw of the load can draw down the output voltage of the regulator. When the output of the regulator is at or below the low voltage limit, the switching of the regulator can be enabled, and the cycle can be repeated to operate the load with reduced voltage, reduced current, and reduced switching.

If the current draw of the load changes, for example, increases at 404, such an increase can delay or prevent the switched-capacitor regulator from raising the output voltage at the same rate as when the current draw of the load was lower. The control logic of the regulator can monitor the increased delay between enabling the switching of the regulator and when the output voltage reaches the second, high voltage limit. If the delay is longer than a predetermined threshold, the control logic of the regulator can attempt to establish a gain to support the increased current draw of the load and the process can repeat such as at 405.

Figure 5A:
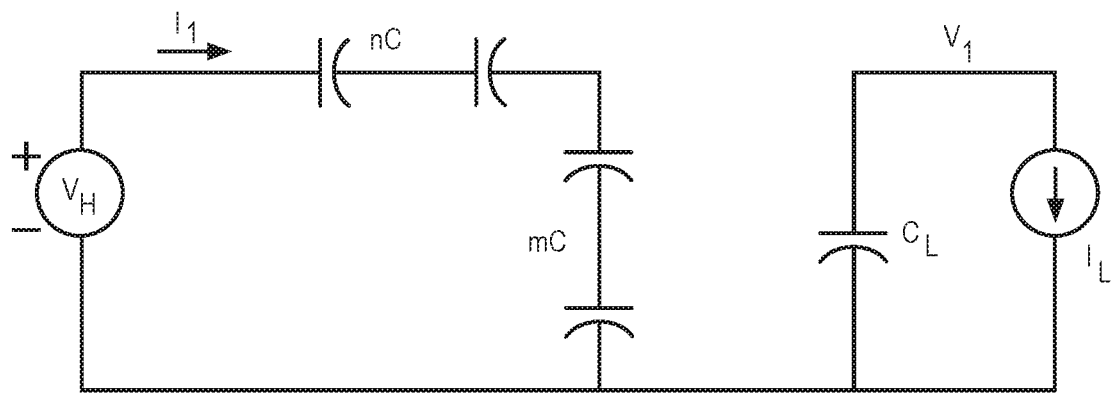
FIGS. 5A-5B illustrate generally example configurations of a switched capacitor network of a switched-capacitor voltage converter according to various aspects of the present subject matter.
Figure 5B:
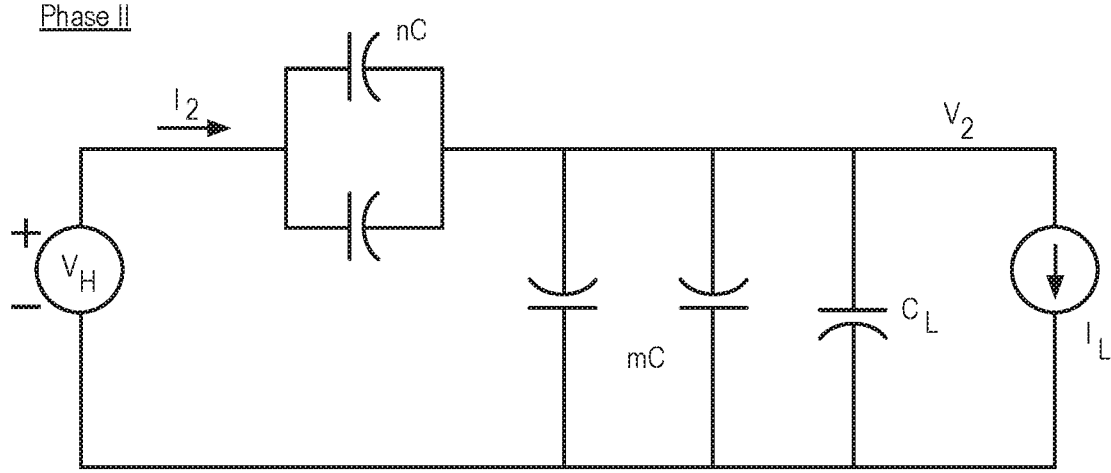

FIGS. 5A-5B illustrate generally example configurations of switched capacitors of a switched-capacitor voltage converter coupled between a battery voltage and a load during first state, a charge phase (FIG. 5A), and a second state, a discharge phase (FIG. 5B), in accordance with some embodiments. FIG. 5A shows the switched capacitors nC and mC in a charge configuration in which they are charged by a battery voltage $V_H$. FIG. 5B shows the switched capacitors nC and mC in a discharge configuration in which their discharge charges a reservoir capacitor $C_L$. The converter includes multiple capacitors that are allocated into a first set and a second set. In accordance with some embodiments the first set may be an "n set" and the second set may be an "m set".

More specifically, in accordance with some embodiments, the converter includes n+m switched capacitors. As explained more fully below, an n set containing n switched capacitors act in an 'n-role' and an m set containing m switched capacitors act in an 'm-role'. The number of switched capacitors in the n set and the number of switched capacitors in the m set is varied to vary gain across the converter. Referring to FIG. 5A, during the charge phase when the m+n switched capacitors are coupled in a charge configuration, both switched capacitors selected to be in the n set and switched capacitors selected to be in the m set are coupled in series between the battery voltage, $V_{Bat}$, and ground. That is, both the switched capacitors in the n set and the switched capacitors in the m set are coupled in series between the battery voltage, $V_{Bat}$, and ground. During the charge phase, a low power voltage level and load current $I_L$ are applied to the Load using a reservoir capacitor $C_{Res}$, which is connected in parallel with the Load. During the charge phase, the n+m switched capacitors are decoupled from $C_{Res}$. Referring to FIG. 5B, during the discharge phase when the m+n switched capacitors are coupled in a discharge configuration, the n switched capacitors that are selected to be in the n set are coupled in parallel with each other and in series with $C_{Res}$, and the m switched capacitors selected to be in the m set are coupled in parallel with each other and with $C_{Res}$. During the discharge phase, the discharge of the voltages on the n switched capacitors in the n set and the m switched capacitors in the m set recharges voltage on $C_{Res}$.

As used herein the n-role refers to the configuration of n switched capacitors in parallel with each other and in series with $C_{Res}$ during the discharge phase. Each switched capacitor in the n set is configured through one or more switches to be coupled in parallel with each other switched capacitor acting in the n set and in series with $C_{Res}$ during the charge phase. As used herein, the m-role refers to the configuration of m switched capacitors that are coupled in parallel with each other and with $C_{Res}$ during the discharge phase. Each switched capacitor in the m set is configured through one or more switches to be coupled in parallel with each other switched capacitor in the m set and in parallel with $C_{Res}$ during the discharge phase. In accordance with some embodiments, the switched capacitors in the m set are coupled, during the discharge phase, with their polarities reversed relative to their coupling during the charge phase.

Figure 6:
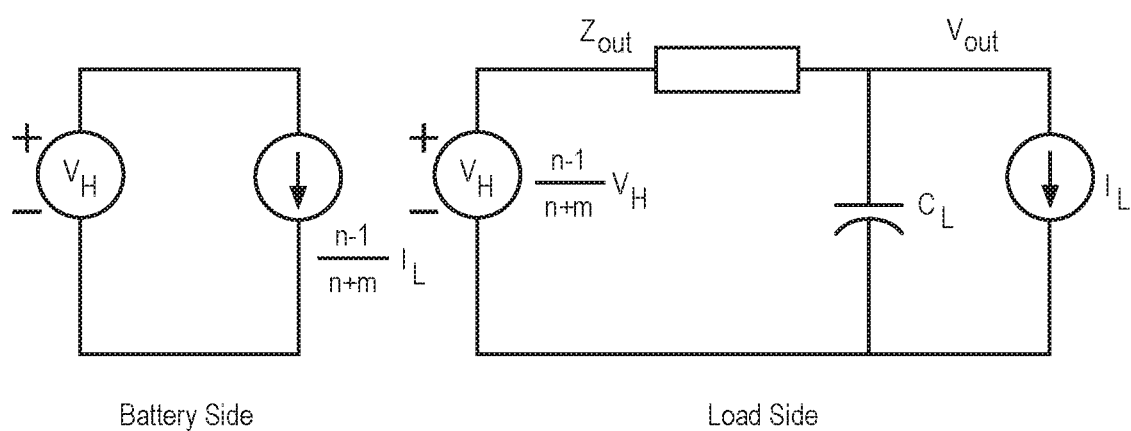
FIG. 6 is an illustrative drawing representing an equivalent circuit for the converter of FIGS. 5A-5B in accordance with some examples.

FIG. 6 is an illustrative drawing representing an equivalent circuit for the converter of FIGS. 5A-5B in accordance with some embodiments. A battery side includes the battery voltage $V_H$ and a battery current, $$\frac{n-1}{n+m}I_L.$$

A Load side includes the voltage, $$\frac{n-1}{n+m}V_H,$$

impedance (Zout), the reservoir capacitor ($C_L$) and a Load current ($I_L$) source. Impedance (Zout) coupled in parallel with the reservoir capacitance $C_L$ represents impedance due to the switched capacitors.

The number of switched capacitors in the n set and the number of switched capacitors in the m set is selectively varied with desired gain across the converter. However, in accordance with some embodiments, the same total number of switched capacitors, m+n, is used for each of multiple different gains. Moreover, in accordance with some embodiments, at least some of the polarities of the m switch capacitors selected to be in the tri-role are reversed when coupled in parallel during the discharge phase.

Gain (A) is represented as follows, $$A = \frac{n+1}{n+m}$$

It is noted that gain varies substantially linearly with the number of switched capacitors in the n set.

Output impedance of the converter is represented as follows, $$Z_o = \frac{1}{fC(n+m)}$$

The value (f) represents the switching frequency of capacitor switching; the value (C) is the value of the individual switched capacitors. It is noted that the output impedance is independent of the gain setting. Thus, it is possible to vary the gain with the confidence that the voltage drop of the converter does not vary substantially with gain, which facilitates ease of regulation of the output voltage $V_{out}$.

It will be appreciated that an advantage of a configuration of an n set of switched capacitors and an m set of switched capacitors into n-roles and m-roles as described above is that substantially all the integrated circuit (IC) area used to implement capacitors contributes to improve the output impedance, since the number of n capacitors and m capacitors is added up to arrive at the output impedance $Z_O$. In accordance with some embodiments, once a given chip area is committed to act as a switched capacitor block, it can be advantageous to divide it up in many capacitor devices so as to produce many different gains. In general, the larger the number of different gains, the higher the efficiency achievable over the input voltage supply range. A limit to the number of gains arises, however, due to the fact that adding more switched capacitors necessitates more switches to control them.

Battery current used in charging the switch capacitors is represented as follows, $$I_{bat} = I_L \frac{n-1}{n+m}$$

The value $I_L$ represents the current through the Load that is driven by the converter. It is noted that $I_{bat}$ is less than $I_L$ by the gain factor (A). The battery current only depends on the load current, which means that no charge sharing occurs among the capacitors.

Output voltage ($V_{out}$) produced by the converter to drive the Load is represented as follows, $$V_{out} = V_H \frac{n-1}{n+m} - I_L Z_{out}$$

Efficiency (ε) of the converter is represented as follows, $$\epsilon = 1 - \frac{I_L}{fCV_H(n-1)}.$$

VARIOUS NOTES & EXAMPLES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, the terms "including" and "comprising" are open-ended, that is, a system, device, article, composition, formulation, or process that includes elements in addition to those listed after such a term are still deemed to fall within the scope of subject matter discussed. Moreover, such as may appear in a claim, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of a claim. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. The following aspects are hereby incorporated into the Detailed Description as examples or embodiments, with each aspect standing on its own as a separate embodiment, and it is contemplated that such embodiments can be combined with each other in various combinations or permutations.

What is claimed is:

1. A method of operating a switched-capacitor voltage regulator to transform an input voltage level at an input node to an output voltage at an output node by allowing switching capacitor reconfiguration between an input capacitor arrangement when capacitors of the switched-capacitor voltage regulator receive charge from the input node and an output capacitor arrangement when the capacitors provide charge to the output node, the method comprising:
   receiving the input voltage level;
   iteratively selecting capacitor configuration settings of a plurality of capacitor configuration settings to provide a scaled output voltage within a desired output voltage range, wherein the iteratively selecting the capacitor configuration settings includes:
   selecting a capacitor configuration setting in response to a last capacitor configuration setting failing to settle the output voltage within the desired output voltage range; and
   ending the iteratively selecting capacitor configuration settings in response to a capacitor configuration of the new capacitor configuration setting settling the output voltage within the desired output voltage range;
   interrupting switching of the capacitor configuration to permit the output voltage to fall below the scaled output voltage in response to the ending the iteratively selecting capacitor configuration settings; and
   resume switching to provide the output voltage above a lower limit of the desired output voltage range.

2. The method of claim 1, wherein the interrupting is triggered at a first voltage threshold below the scaled output voltage.

3. The method of claim 2, wherein the interrupting includes selecting a voltage divider of a feedback circuit of the switched-capacitor voltage regulator to provide the first voltage threshold.

4. The method of claim 3, wherein the resuming switching includes inhibiting switching of the switched-capacitor voltage regulator in response to the output voltage level meeting or exceeding a first value representative of the first voltage threshold.

5. The method of claim 4, wherein the resuming switching includes enabling switching of the switched-capacitor voltage regulator based on a clock signal of a clock of the switched-capacitor regulator in response to the output voltage level meeting or falling below a second value representative of the lower limit.

6. The method of claim 4, including selecting a second voltage divider of the feedback circuit in response to the output voltage level failing to meet or exceed the first value after a first interval after the switching of the switched-capacitor voltage regulator is enabled, wherein the second voltage divider is representative of a second voltage threshold higher than the first voltage threshold.

7. The method of claim 6, including resetting a timer for the first interval when the switching is enabled.

8. The method of claim 2, including selecting a second voltage divider of a feedback circuit in response to the output voltage level failing to meet or exceed a first value representative of the first voltage threshold after a first interval, the first interval initiated after switching of the switched capacitor voltage regulator is re-enabled.

9. The method of claim 1, including iteratively reselecting a second capacitor configuration in response to an expiration of a timer.

10. The method of claim 1, wherein an output impedance of the switched-capacitor voltage regulator is independent of the capacitor configuration setting.

11. The method of claim 1, wherein the plurality of capacitor configuration settings provides multiple, equally distributed gains for the switched-capacitor voltage regulator.

12. A method of operating a regulator, the regulator having a switched-capacitor array configured to receive an input voltage and provide an output voltage as scaled version of the input voltage, the method comprising:

determining a scale factor of a plurality of scale factors of the regulator using a first high voltage limit, a low voltage limit and a clock configured to switch the switched-capacitor array, the scale factor configured to provide a nominal output voltage level between the first high voltage limit and the low voltage limit; establishing a second high voltage limit after the scale factor is determined, wherein the second high voltage limit is lower than the first high voltage limit; inhibiting switching of the switched capacitor array in response to the output voltage rising above the second high voltage limit; initiating switching of the switched capacitor array based on a clock signal of the clock in response to the output voltage falling below the low voltage limit; and iteratively determining a second scale factor in response to an expiration of a timer.

13. The method of claim 12, wherein the determining the scale factor includes rearranging the switched-capacitor array until the output voltage settles between the first high voltage limit and the second high voltage limit.

14. The method of claim 13, wherein the determining the scale factor includes inhibiting switching of the switched capacitor array in response to the output voltage settling between the first high voltage limit and the second high voltage limit.

15. The method of claim 12, wherein the regulator is a buck regulator.

16. The method of claim 12, wherein an output impedance of the switched-capacitor voltage regulator is the same for each scale factor of the plurality of scale factors.

17. The method of claim 12, wherein the scale factors of the plurality of scale factors are evenly distributed.

18. A switched-capacitor voltage regulator comprising:
a switched-capacitor network having multiple gain configurations,
a clock configured to switch capacitors of the switched-capacitor network between a charge state and a discharge state to provide a scaled output voltage; and
a controller configured to:
iteratively alternate between a next-lowest high gain configuration of the switched capacitor network and a next-highest low gain configuration of the switched capacitor network to determine a capacitor configuration associated with a gain of the multiple gain configurations to provide the scaled output voltage within a desired output voltage range;
interrupt a clock signal to the switched capacitor to permit an output voltage of the switched-capacitor voltage regulator to fall below the scaled output voltage; and
resume the clock signal to provide the output voltage above a lower limit of the desired output voltage range.

19. The switched-capacitor voltage regulator of claim 18, wherein an output impedance of the switch capacitor network is independent of a selected gain configuration of the multiple gain configurations.

20. The switched-capacitor voltage regulator of claim 18, wherein the multiple gain configurations are equally distributed.

21. The switched-capacitor voltage regulator of claim 18, wherein the controller is configured to disable the clock in response to the output voltage meeting or exceeding a first voltage threshold; and wherein the first threshold is lower than the scaled output voltage.

22. The switched-capacitor voltage regulator of claim 21, wherein the controller is configured to select a voltage divider of a feedback network of the switched-capacitor voltage regulator to provide the first voltage threshold.

23. The switched-capacitor voltage regulator of claim 22, wherein the controller is configured to enable the clock in response to the output voltage meeting or falling below a value representative of the lower limit.

24. The switched-capacitor voltage regulator of claim 23, wherein the controller is configured to select a second voltage divider of the feedback network in response to the output voltage failing to meet or exceed the first threshold a first interval after the clock of the switched-capacitor voltage regulator is enabled, wherein the second voltage divider is representative of a second voltage threshold higher than the first voltage threshold.

25. The switched-capacitor voltage regulator of claim 18, wherein the controller is configured to iteratively determine a second capacitor configuration associated with a second gain of the multiple gain configurations in response to an expiration of a timer initiated after determination of a prior capacitor configuration.

* * * * *